W. G. HUMPHREYS.
Seed and Fertilizer Sower
No. 218,271. Patented Aug. 5, 1879.
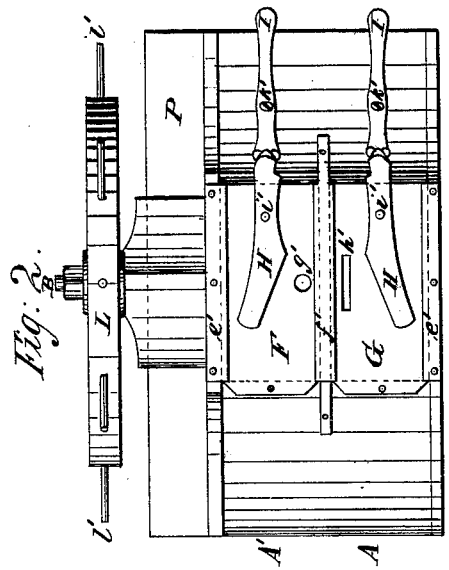
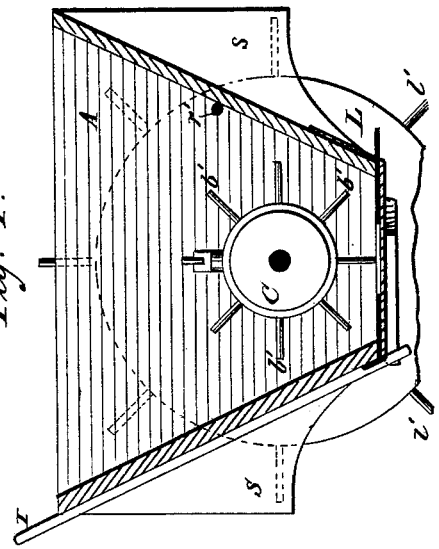
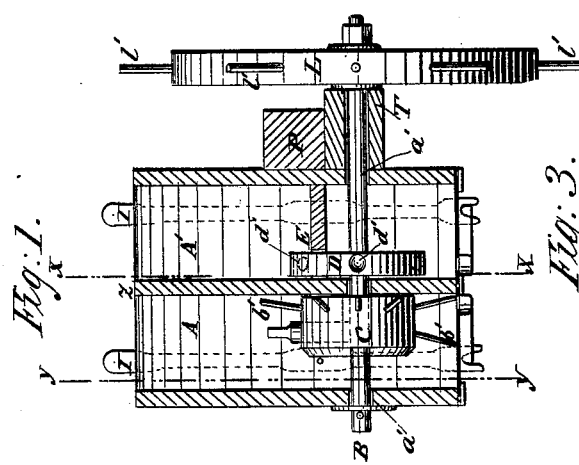
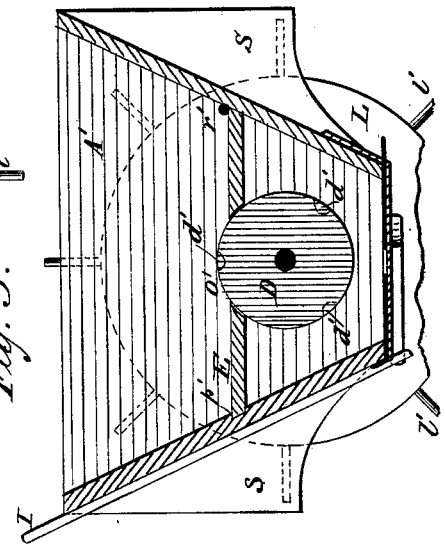
WITNESSES:
Achilles Schehl.
C. Sedgwick
INVENTOR:
W. G. Humphrey
BY Munn & Co
ATTORNEYS.

UNITED STATES PATENT OFFICE

WILLIAM G. HUMPHREYS, OF PENDLETON, SOUTH CAROLINA.

IMPROVEMENT IN SEED AND FERTILIZER SOWERS.

Specification forming part of Letters Patent No. 218,271, dated August 5, 1879; application filed January 6, 1879.

*To all whom it may concern:*

Be it known that I, WILLIAM G. HUMPHREYS, of Pendleton, in the county of Anderson and State of South Carolina, (resides in Oconee county,) have invented a new and Improved Seed and Fertilizer Sower, of which the following is a specification.

Figure 1 is an upright cross-section. Fig. 2 is a plan view of the under side. Fig. 3 is a sectional view on line $x\ x$ of Fig. 1. Fig. 4 is a sectional view on line $y\ y$ of Fig. 1.

Similar letters of reference indicate corresponding parts.

The object of this invention is to furnish an improved machine or apparatus which is to be mounted on a plow-beam for sowing and distributing seeds and fertilizers.

Referring to the drawings, A and A' are the two hoppers, separated by a diaphragm, Z, for holding seed and fertilizers. A is shown as ordinarily arranged for sowing fertilizers, and A' for seed; but both may be put to either use. B is the shaft or axle, resting in bearings $a'\ a'$, and carrying two distributing wheels or cylinders. The cylinder C is shown arranged with projecting spikes or pins $b'\ b'$, for the better delivery and distribution of fertilizers, and D with holes or cup-shaped depressions $d'\ d'$ made in its periphery, for the purpose of insuring an even sowing of seeds or grain. E is a removable shelf or false bottom, which is fitted into the seed-hopper closely against the wheel D. It has a slot or recess made in it, through which an arc of the wheel protrudes, as shown at $o'$. It is secured in position by a groove, $p'$, cut in the inner face of one slope of the hopper, and by the rod $r'$.

It is obvious that under this arrangement the wheel D, when revolving, will not deliver continuously, but only a hole or cup full at a time. This arrangement is especially designed for sowing or dropping a certain measure of seeds at a time—as, for instance, when sowing corn or beans in hills.

The bottoms of the hoppers are closed with two slides, F and G, which can be removed when desirable, held tightly in position by plates or straps $e'$ and $f'$. $g'$ and $h'$ are the discharge-holes, through which the fertilizer or seeds issue from the hoppers. These holes may be of any shape; but the circular for seeds and the elongated for fertilizers are as convenient as any others.

H H are the doors or covers of the holes $g'$ and $h'$. They are pivoted at $i\ i$, and operated by the levers I I, which extend up the slope of the hoppers and are pivoted at $k'\ k'$.

L is the driving-wheel, keyed upon the shaft B, and furnished on its periphery with spikes or teeth $l'\ l'$. P is a straight piece of timber, which is intended to represent the plow-beam, and is here shown that it may be more clearly understood how the sower is to be attached to a plow. The flanges $s\ s$ are bolted to the right side of the beam, near the clevis end thereof, so that the shaft or axle B shall pass under the beam and be held up by a bearing or keeper, T. The hoppers carrying the seed and fertilizers extend over the right side of the plow beam, and the driving-wheel on the left.

When the plow is in motion the spikes or teeth of the driving-wheel engage with the earth and cause the wheel to revolve.

The spikes can be made of any required length to suit the different heights of plow-stocks.

The movement of the driving-wheel revolves the two wheels or cylinders within the hoppers, and the contents of the hoppers are discharged through the holes in their bottoms.

It is clearly evident that by substitution or change of wheels both hoppers may be made to discharge either seeds or fertilizers.

By removing wheel C and putting one like D in its place, and at the same time fitting a false bottom like E in the present fertilizer-hopper, I have the best arrangement for sowing seeds and grain therefrom.

By substituting a wheel like C for the wheel D, I have two fertilizer-hoppers.

By increasing or diminishing the number of holes $d'$ in the periphery of the seed-wheel, I may increase or diminish the rate of sowing in a continuous drill, and the distance apart of the hills planted or of the bunches of seed in the drills.

It will be seen that any two kinds of seeds, such as corn and beans or pease, which are often sown together, can be sown at the same time; that corn and guano, cotton-seed and mineral phosphate, or any seed and fertilizer can be sown with accuracy at one and the same time, or in quick alternation, by this apparatus, the plowshare marking the furrow in advance of the sowing. Or the machine may in other ways be changed, so that the teeth of the driving-wheel shall engage with the ground, and fertilizers or seed sown at will. It need not necessarily be attached to a plow in order to operate effectively.

Having thus described my invention, I claim as new and desire to secure by Letters Patent—

The combination of the hoppers A A', provided with the false bottom E, the slides F and G, and the covers H H, the latter being operated by the levers I I, the seed-sowing wheel D, the fertilizer-distributer C, the shaft B, and the spiked driving-wheel, with the plow-beam P, substantially as and for the purpose described.

WILLIAM GARRISON HUMPHREYS.

Witnesses:
W. H. D. GAILLARD,
THOS. L. CUTHBERT.